United States Patent [19]
Fornelli

[11] Patent Number: 6,082,795
[45] Date of Patent: Jul. 4, 2000

[54] GARDEN TOOL DEVICE

[76] Inventor: Joseph C. Fornelli, 1017 S. Prospect, Park Ridge, Ill. 60068-4728

[21] Appl. No.: 09/245,670

[22] Filed: Feb. 8, 1999

[51] Int. Cl.[7] .................................. A01B 1/22; B25G 3/24
[52] U.S. Cl. ................................. 294/58; 16/422; 294/25; 294/51
[58] Field of Search .............................. 294/19.1, 25, 26, 294/50.6, 50.8, 51, 57, 58; 15/144.1, 145; 16/422, 426, 427, 429, 430; 43/21.2, 25; 56/400.01, 400.04; 135/71–73; 172/371, 372, 375; 224/218, 219, 222; D8/10, 13, 107

[56] References Cited

U.S. PATENT DOCUMENTS

| | | | |
|---|---|---|---|
| D. 339,966 | 10/1993 | Burnett | 294/57 X |
| 712,843 | 11/1902 | Paul . | |
| 1,086,636 | 2/1914 | Anderson | 294/26 |
| 2,482,589 | 9/1949 | Maguire | 294/58 X |
| 2,710,571 | 6/1955 | Pfister | 294/50.6 X |
| 4,888,846 | 12/1989 | Natale . | |
| 4,924,924 | 5/1990 | Stewart | 16/426 X |
| 5,060,343 | 10/1991 | Nisenbaum | 294/58 X |
| 5,156,429 | 10/1992 | Adams | 294/25 |
| 5,228,610 | 7/1993 | Spence . | |
| 5,272,788 | 12/1993 | Gilstrap . | |
| 5,379,758 | 1/1995 | Snyder | 16/430 X |
| 5,451,085 | 9/1995 | Wagner . | |
| 5,499,852 | 3/1996 | Seigendall . | |
| 5,529,357 | 6/1996 | Hoffman . | |
| 5,687,556 | 11/1997 | Lintz | 294/50.6 X |
| 5,716,087 | 2/1998 | Backich et al. . | |
| 5,937,627 | 8/1999 | McKittrick | 294/58 X |

FOREIGN PATENT DOCUMENTS

| | | | |
|---|---|---|---|
| 2183433 | 6/1987 | United Kingdom | 294/58 |
| 2278698 | 12/1994 | United Kingdom . | |
| 2298158 | 8/1996 | United Kingdom . | |

*Primary Examiner*—Johnny D. Cherry
*Attorney, Agent, or Firm*—Sonnenschein, Nath & Rosenthal

[57] ABSTRACT

A leveraged gardening tool device having an elongated body, a hand grip, a forearm receptacle at one end of the elongated body and a gardening tool securing mechanism at the other end of the opposing end of the elongated body for receiving and maintaining the shaft of a small gardening tool. The elongated body has an upper portion and a lower portion, the upper and lower portions being separated by an approximate 195° bend in the elongated body. The bend is provided for optimal one-handed use of the gardening tool and results in a decrease in the amount of fatigue traditionally encountered when using a conventional hand-held gardening tool. One embodiment of the invention allows for an assortment of removably engageable gardening tools for use with the gardening tool.

17 Claims, 3 Drawing Sheets

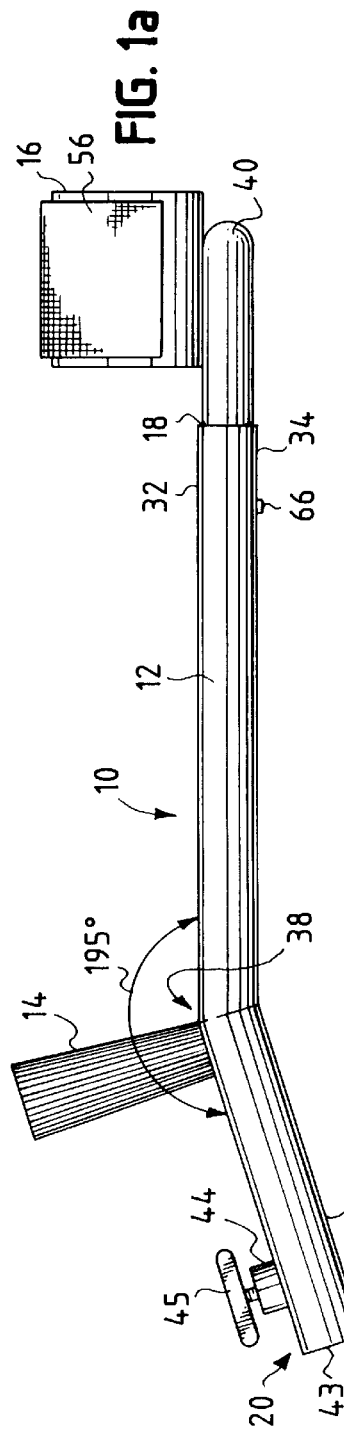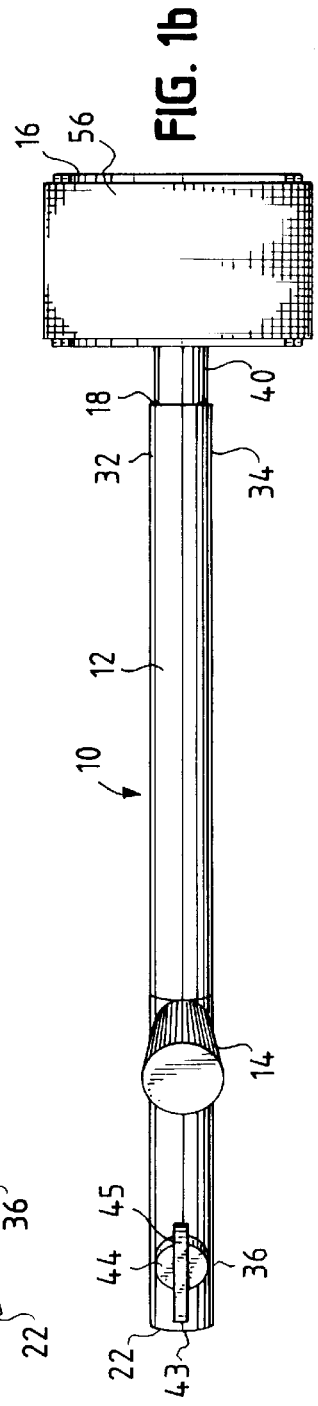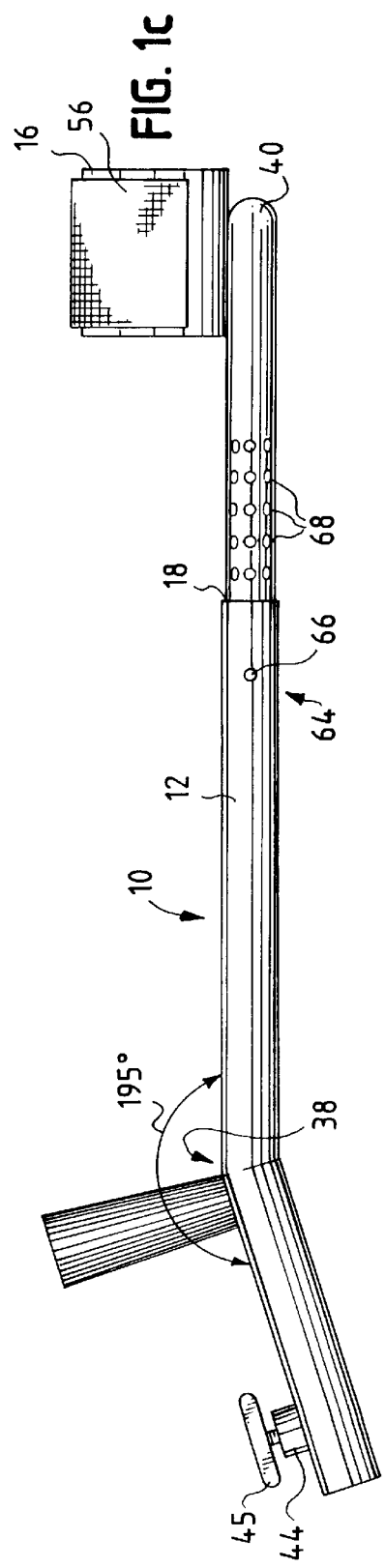

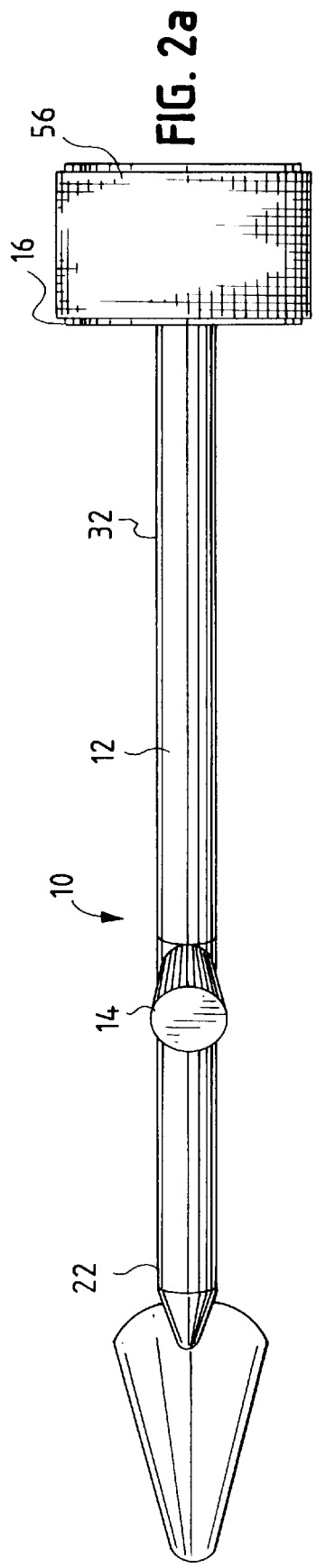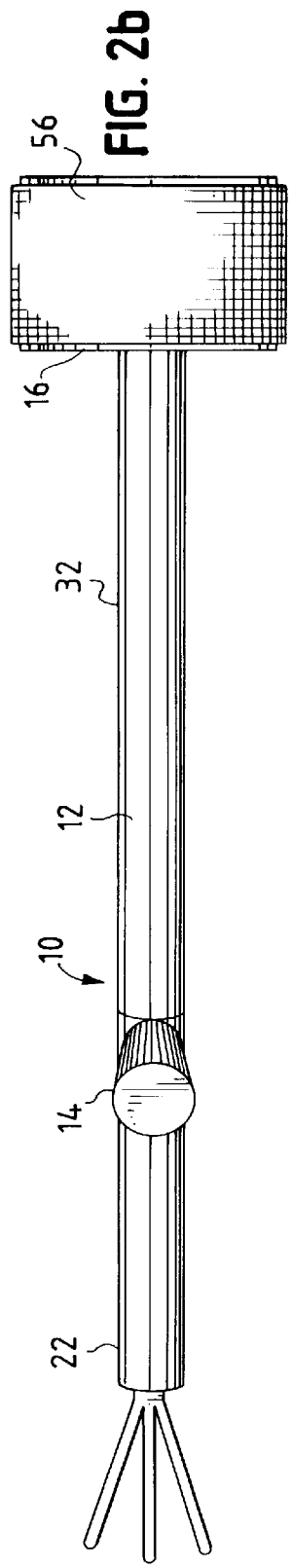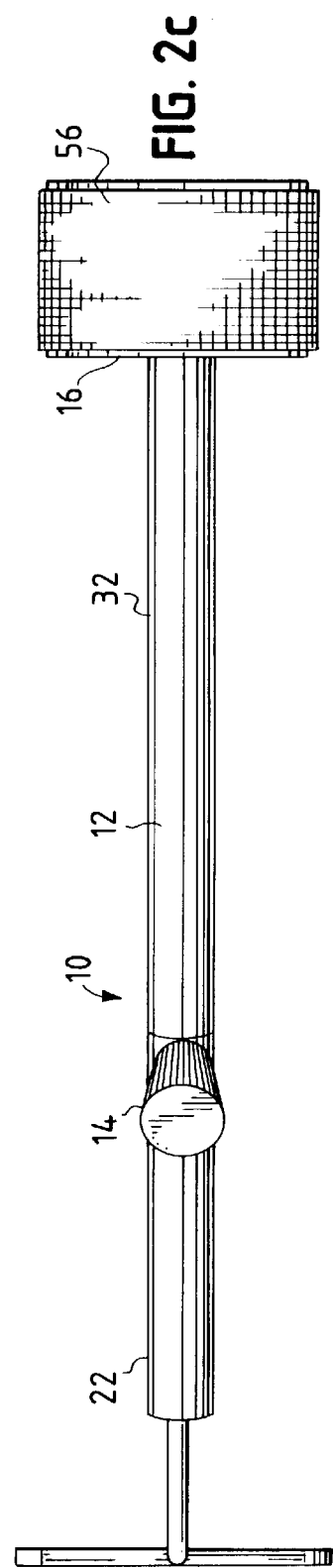

GARDEN TOOL DEVICE

BACKGROUND OF THE INVENTION

A. Field of the Invention

This invention relates generally to gardening tools and in particular to a garden tool device comprising an elongated body having a bend, a handle, a forearm receptacle at one end of the elongated body, and a garden tool securing mechanism at the opposite end of the elongated body for receiving the handle of a garden tool and for applying optimum leverage to the working head of the gardening tool with minimum fatigue for the user, by allowing not just the hand and wrist but the whole arm and upper body to work the gardening tool.

B. Prior Art

Currently, small hand-held gardening tools such as trowels, rakes and hoes are generally one-piece tools having a short body, the body either connected at one end to the desired tool and at the other end to a short handle, or being one contiguous piece with the tool and providing a handle opposite the tool. A hand-held gardening tool is useful for precise and accurate weeding, cultivating, planting and digging in a small enclosed or isolated area. Due to the size of the gardening tool, a gardener using a hand-held tool can work on a small enclosed plot for plants and bulbs or an area within a garden surrounded by plants with a minimum of disruption or damage to the surrounding plants. A hand-held tool is typically ideal when a larger gardening implement might otherwise be impractical to use. Similarly, the hand-held tool is generally preferred over larger gardening tools because the hand-held tool requires the use of only one hand, takes up minimum space and is easily stored, it's the gardener's choice. The drawbacks, however, to working with a hand-held gardening tool are that the user needs to bend over, kneel or sit down in order to get close enough to the ground to effectively garden. This bending motion causes the joints and muscles of the legs and back to quickly tire. Similarly, the short shaft of such a hand-held tool causes the hand, and especially the wrist and arm, to quickly fatigue from the continuous digging motion and amount of pressure required to be placed on the shaft of the tool by the user's hand, wrist and arm when utilizing the tool to dig in a garden.

In an effort to solve the problem of fatigue associated with applying sufficient hand and arm pressure to the gardening tool to penetrate the soil, gardening tools with elongated shafts of varying lengths to provide additional leverage have been introduced. Despite the redesigning of these gardening tools, users still encounter the problem of a quick rate of fatigue in the joints and insides of the hand, wrist and forearm because the size and construction of the prior hand-held tools prevented leveraging force from the rest of the body to be optimally applied to the tool during gardening. Present garden tools require unnatural hand/wrist alignment during use.

Additionally, as the length of the elongated shaft increases, a user needs to use both hands in order to gain enough leverage to garden effectively. Thus, while the elongated shafts decrease the amount of back and leg fatigue, the fatigue of the hands, wrists and arms increase by requiring the user to use both hands. Requiring the use of both hands defeats the purpose of a hand-held gardening tool, namely to use only one hand to garden while allowing the free hand to position bulbs or other plants. Furthermore, the increased distance from the target area caused by the length of the handle decreases accuracy and precision in gardening.

Similarly, gardening tools with an additional handle have been introduced to overcome the fatigue of the hand, wrist and forearm associated with traditional hand-held tools. Once again, even though the additional handle provided some increased leverage, these tools require the use of both hands and thus defeated the desired purpose of a hand-held tool.

Accordingly, the present invention is designed to provide a gardening tool that requires the use of only one hand to use, but reduces the amount of fatigue to the back, legs, hand, wrist and arm normally associated with the use of a hand-held gardening tool by bridging the weak wrist area and allowing the hand muscles to work directly with the forearm muscles to which they are attached.

SUMMARY OF THE INVENTION

Accordingly, it is a primary object of the present invention to provide a garden tool device having a bend in the elongated body to decrease not only fatigue in the forearm and wrist while gardening but also allowing the user to use other muscles and body mass to provide additional leverage against the tool and a better angle of attacking the soil as the tool penetrates the soil.

Another object of the present invention is to provide the user with a garden tool device with interchangeable tools to provide the gardener with versatility of use of the device.

In accordance with these and other objects and advantages, one embodiment of the present invention provides a garden tool device having an elongated body, a hand grip, a forearm receptacle at one end of the elongated body greatly aiding leverage and a garden tool securing mechanism at the opposing end of the elongated body for receiving and engaging the shaft of a hand-held garden tool. The elongated body has an approximately 195° optimal bend for creating better leverage of the tool against the soil when in use. The increased leverage, activated by the downward pressure of the forearm, is useful when crowding during digging, raking, hoeing and pruning. The ground being cultivated becomes a fulcrum for the elongated forearm of the tool. In this embodiment, the forearm receptacle contains a strap to secure the user's forearm in the forearm receptacle during use of the garden tool device, keeping the garden tool device in place, and the garden tool securing mechanism removably engages the shaft of any small garden tool such as a trowel, rake, hoe or pruning saw. The hand grip is positioned along the shaft such that a user, after having secured his or her forearm in the forearm receptacle, can easily grasp the hand grip. A wedge-shaped hand grip is preferably provided to force pressure into the palm when using the garden tool device, thereby decreasing the necessity of a stressful grip.

In an alternative embodiment of the present invention, the garden tool adapter comprises a one-piece device having an elongated body, a hand grip, a forearm receptacle positioned at one end of the body and a garden tool portion permanently affixed to the opposing end of the elongated body. As in the previous embodiment, the elongated body has an approximately 195° bend optimal for greatly increased leverage. The main difference in this embodiment from the previous embodiment is that the elongated body does not have a garden tool securing mechanism to allow the garden tools to be interchangeable because the gardening tool is permanently affixed to the elongated body.

These and other objects and advantages will be apparent from the following description of the preferred embodiments with reference to the attached drawings.

DESCRIPTION OF THE DRAWINGS

FIG. 1a is a side view of one embodiment of the garden tool device of the present invention.

FIG. 1b is a top view of the garden tool device of FIG. 1a.

FIG. 1c is a side view of the garden tool device showing an example of a shaft securing mechanism.

FIG. 2a is a top view of a one-piece construction embodiment of a garden tool device of the present invention showing a trowel as a garden tool portion.

FIG. 2b is a top view of the one-piece construction embodiment of FIG. 2a showing a rake as a garden tool portion.

FIG. 2c is a top view of the one-piece construction embodiment of FIG. 2a showing a hoe as a garden tool portion.

FIG. 3 is a rear view of the garden tool device of FIG. 1a.

FIG. 4a is a top view of a trowel that is an example of a garden tool that may be detachably affixed to the garden tool device of FIG. 1a.

FIG. 4b is a side view of a rake that is an example of a garden tool that may be detachably affixed to the garden tool device of FIG. 1a.

FIG. 4c is a side view of a hoe that is an example of a garden tool that may be detachably affixed to the garden tool device of FIG. 1a.

FIG. 4d is a side view of a pruning saw that is an example of a garden tool that may be detachably affixed to the garden tool device of FIG. 1a.

DESCRIPTION OF THE PREFERRED EMBODIMENTS

Figure 3:
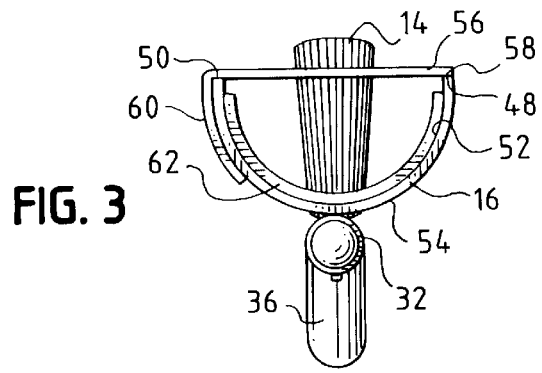
Figure 4A:
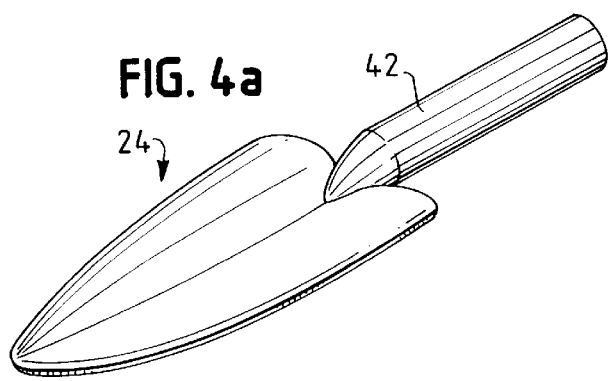
Figure 4B:
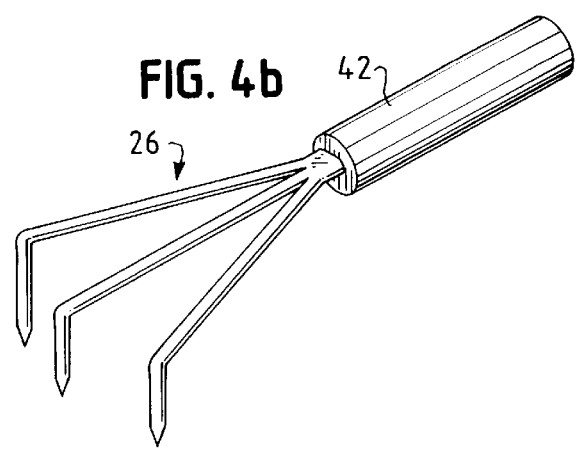
Figure 4C:
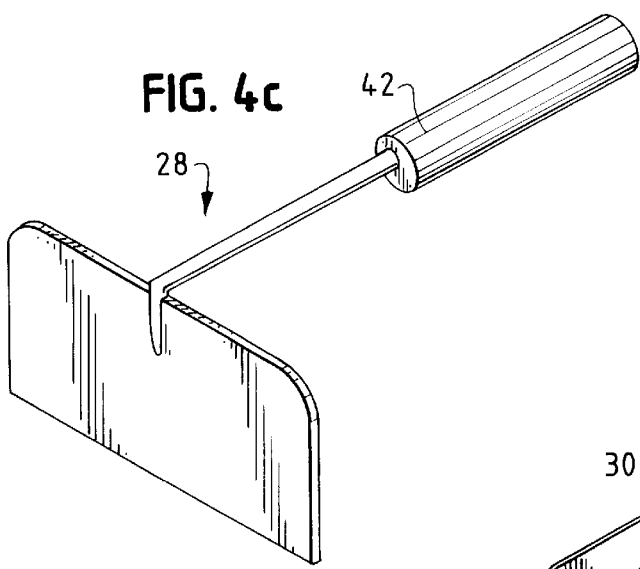
Figure 4D:
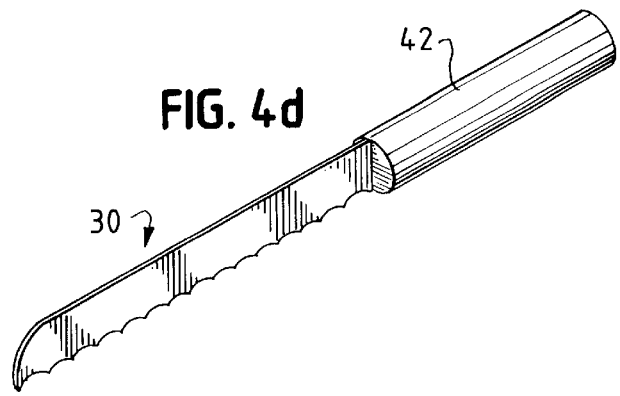

As seen in FIGS. 1a, 1b, 1c and 3, the garden tool device 10 of the present invention consists generally of an elongated body 12 having a hand grip 14, a forearm receptacle 16 attached to a first end 18 of the elongated body 12 and a garden tool securing mechanism 20 for removably affixing a garden tool to a second end 22 of the elongated body 12. As seen in FIGS. 4a–4d, the garden tool may be a trowel 24, rake 26, hoe 28, or pruning saw 30 or other like tool used for gardening. It is understood than an extension may be used with the device 10 to allow use of the device 10 when standing.

As described above, the purpose of this invention is to provide a garden tool device 10 that has an elongated, bent elongated body 12 that gives the user not only more leverage against the ground when gardening, but also decreases the amount of fatigue and pain in the back and legs associated with bending and the fatigue and pain in the hand, wrist and arm associated with applying downward force against the ground, where the ground is the fulcrum, when crowding the gardening tool into or against the soil, or against a branch. The physiology of the bent elongated body 12 is shaped to match the physiology of the shape of a user's forearm.

As shown in FIGS. 1a–c, the elongated body 12 of the garden tool device 10 is preferably hollow and has a first end 18, a second end 22, an outer surface 32, an inner surface (not shown), an upper section 34 and a lower section 36. The elongated body 12 of the garden tool device 10 further comprises a bend 38 in the elongated body 12 such that an obtuse angle is formed between the upper section 34 and the lower section 36 of the elongated body 12. The bend 38 is generally located just past the middle of elongated body 12 toward end 22 but not above the middle of elongated body 12. However, as the length of the elongated body 12 is changed or modified, the location of the bend 38 can be re-positioned as necessary to maximize the amount of force applied by a user to the associated gardening tool. To optimize the leverage of a user, it is preferred that the bend 38 define an approximate 195° angle from the upper section 34 of the elongated body 12 to the lower section 36 of the elongated body 12, but other angles are also suitable.

In the first illustrative embodiment, the elongated body 12 of the garden tool device 10 is comprised of a hollow tubular structure, preferably made of metal, heavy durable impact type plastic, composite or other like material resistant to breaking and bending when in use as a gardening tool. While it is preferred that the entire elongated body 12 be hollow to decrease the weight of the garden tool device 10, one skilled in the art will recognize that it is only necessary for the portion of the ends 18, 22 of the elongated body 12 that are adapted to receive either a forearm receptacle or a garden tool to be hollow for a length sufficient to secure either a shaft 40 of the forearm receptacle 16 or a handle 42 of a garden tool 24, 26, 28, 30 (FIGS. 4a–d).

The thickness of the elongated body 12 is largely dependent upon the type of material utilized and should be of sufficient thickness to resist breaking and bending of the elongated body 12 when in use. In the embodiment illustrated in FIGS. 1a–c, the tubular structure is made of metal and is approximately one-sixteenth of an inch ($\frac{1}{16}$") to two-sixteenths of an inch ($\frac{2}{16}$") thick, measuring from the interior circumference (or inner surface) of the elongated hollow tubular body 12 to the exterior circumference (or outer surface) of the exterior of the elongated body 12. The exterior circumference of the elongated body 12 generally corresponds to the interior circumference of the elongated body 12 and the necessary thickness of the tubular structure as dictated by the selected material.

As seen in FIGS. 1a, 1b and 1c, the elongated body 12 has a telescoping effect, a left position and a right position. Elongated body 12 has a garden tool securing mechanism 20 at its second end 22, which comprises a receiving mechanism for receiving a handle of a garden tool and mechanism for securely maintaining the handle of the garden tool in the receiving mechanism 43. In the present invention, the receiving mechanism 43 for receiving the handle of a garden tool is the hollow second end 22 of the elongated body 12. Thus, the interior circumference of the elongated body 12 at its second end 22 must be of a size sufficient to allow the handle 42 of a garden tool 24, 26, 28, 30 to fit snugly within the interior of the elongated body 12. The interior circumference of the elongated body 12 can be made of a size to allow a commercially available line of garden tools having substantially similar handle sizes to fit within the interior of the elongated body 12, or the interior circumference can be designed to accommodate a custom line of garden tools designed specifically for use with the present garden tool device 10. In the illustrated embodiment of FIGS. 1a–c, the garden tool device 10 is designed for use with specially designed garden tools 24, 26, 28, 30 that fit within the garden tool securing mechanism 20 of the garden tool device 10. The interior and exterior circumferences of the elongated tubular body 12 in the preferred embodiment range from two inches (2") to three inches (3"); however, the elongated tubular body 12 can be made with interior and exterior circumferences which vary significantly from the circumferences in the preferred embodiment, especially if the present invention is being designed to work in conjunction with a selected line of garden tools already commercially available.

In the illustrated embodiment of FIGS. 1a–c, the garden tool securing mechanism 20 includes a device for maintaining the handle of the garden tool in the hollow second end 22 of the elongated body 12 which allows the user to removably attach different garden tools to the second end 22 of the elongated body 12. As described previously, the elongated body 12 of the present invention includes a receiving mechanism 43 located at the second end 22 of elongated body 12, which is adapted to receive the handle 42 of a garden tool 24, 26, 28, 30. The garden tool maintaining mechanism 44 in the preferred embodiment is a lockdown screw 45, wide enough to allow easy attachment, adjustment and removal with less effort when being manipulated with a gardener's glove as might be the case with older people. The lockdown screw 45 is disposed adjacent the second end 22 of the elongated body 12 engageable within an aperture (not shown) with a groove (not shown) located on the handle 42 of a garden tool adapted to tightly engage the handle 42 of the garden tool 24, 26, 28, 30 when the handle 42 of the garden tool 26, 28, 39, 30 (FIGS. 4a–d) is inserted into the garden tool securing mechanism 20 of the second end 22 of the elongated body 12.

The lockdown screw type securing mechanism 20 allows the user more versatility with the garden tool device 10, potentially allowing the user to use the device with garden tools not specifically adapted for use with the garden tool device 10. With a lockdown screw type securing mechanism 20, no mating parts necessarily need to be placed on the garden tool; however, where the garden tool is designed specifically for use with the device 10, certain mating parts, such as recesses on the handle of the shaft 40 and mating ridges on the interior of the adapter, can help to secure the garden tool 24, 26, 28, 30 more rigidly within the garden tool securing mechanism 20 and maintain the proper orientation of the garden tool 24, 26, 28, 30. While the lockdown screw 45 as a maintaining mechanism 44 is preferred, it is understood that other mechanisms for maintaining each garden tool in the garden tool device 10 may be employed. For example, a garden tool securing mechanism 20 may instead include a hole on the elongated body 12 and a corresponding protuberance located on the handle 42 of the garden tool 24, 26, 28, 30 that fits inside the hole on the elongated body 12 and acts to removably engage the garden tool.

As shown in FIGS. 1a, 1b, 1c, 2a, 2b, 2c, and 3, the first end 18 of the elongated body 12 is equipped to mount a forearm receptacle 16 to maintain a user's arm against the upper section 34 of the elongated body 12. As shown best in FIG. 3, the forearm receptacle 16 is a U-shaped device configured to receive the forearm of a user at or below the elbow. The U-shaped forearm receptacle 16 has a first end 48 and a second end 50 and inner and outer surfaces 52, 54. In the preferred embodiment, a flexible strap 56 having first and second ends 58, 60 is attached to the forearm receptacle 16 with the first end 58 of the flexible strap 56 fixed to the first end 48 of the forearm receptacle 16, and the second end 60 of the flexible strap 56 removably attachable to the second end 50 of the U-shaped forearm receptacle 16 by plastic hook and loop type attachment means, such as sold under the trademark Velcro, or the like. The free end of strap 56 removably attaches to the outer surface 54 of the second end 50 of the forearm receptacle 16. In this manner, the forearm of a user may be inserted into the forearm receptacle 16 and secured against the receptacle 16 by the flexible strap 56. Although not necessary, a cushion pad 62 may be attached to the inner surface 52 of the forearm receptacle 16 for added comfort of the user.

While the above described method of securing the forearm within the forearm receptacle 16 is preferred, any suitable forearm securing device may be employed to secure the forearm within the receptacle 16. Likewise, any suitable means for maintaining the forearm against the upper section 34 of the elongated body 12 may be employed. It is contemplated, however, that a forearm receptacle 16 be either a flexible, semi-flexible or rigid U-shaped or generally circular device and may be made of any suitable material such as a rigid impregnated cloth such as a resin, plastic or metal.

Although the forearm receptacle 16 can be affixed to the upper section 34 of elongated body 12, it is preferred that the forearm receptacle 16 be attached to a shaft 40 of sufficient diameter to be able to slidably fit within a hollow opening (not shown) at the first end 18 of the elongated body 12. In this manner, the positioning of the forearm receptacle 16 can be adjusted axially relative to elongated body 12 to fit the forearm length of the user. To engage the forearm receptacle 16, the shaft 40 of the forearm receptacle 16 must be of a diameter to fit snugly within the hollow first end 18 of the elongated body 12 such that the hollow first end 18 of the elongated body 12 slidably engages the shaft 40 of the forearm receptacle 16.

As shown in FIG. 1c, a shaft securing mechanism 64 is attached to the first end 18 of the elongated body 12. In the illustrated embodiment, shaft securing mechanism 64 comprises a moveable spring pin 66 disposed in the first end 18 of the elongated body 12 through an aperture (not shown), biased inwards and adapted to engage a groove 68 located on shaft 40 which is inserted in the hollow opening (not shown) of the first end 18 of elongated body 12. Alternatively, the shaft 40 of the forearm receptacle 16 can be maintained in the hollow opening (not shown) of the first end 18 of the elongated body 12 with a friction fit. The shaft 40 may to alternatively be maintained in the hollow opening (not shown) adjacent end 18 by means similar to those described above relating to the structure in which the garden tools are held in the garden tool securing mechanism 20 located at the second end 22 of the elongated body 12.

As seen in FIGS. 1a, 1b, 1c and 3, the garden tool device 10 also includes a hand grip 14 which is affixed to and extends upward and away from the elongated body 12, such that a user can grasp the hand grip 14 in the palm of the hand and then secure his or her arm in the forearm receptacle 16. As seen in FIGS. 1 and 2, hand grip 14 is positioned just above the bend 38 in the elongated body 12. While it is preferred that the hand grip 14 be permanently affixed to the elongated body 12, the hand grip 14 can also be adjustably affixed on the elongated body 12 so that the distance of the hand grip 14 away from the forearm receptacle 16 can be adjusted. Hand grip 14 is preferably tapered or wedge-shaped, which configuration forces pressure to be applied to the palm of the hand of the user, thereby allowing adequate pressure and more even force to be applied by the hand to the tool without a maximum firm grip by the user, which decreases fatigue. The upper section 34 of elongated body 12 should be of sufficient length to allow a user of the present invention to comfortably secure their forearm in the forearm receptacle 16 and simultaneously hold the hand grip 14 with their hand.

In a first alternative embodiment of the present invention, illustrated in FIGS. 2a, 2b and 2c, the garden tool device 10 does not provide for interchangeable garden tools, but is designed such that the desired type of garden tool is formed at the second end 22 of the elongated body 12, or comprises a separate structure permanently affixed to the second end 22 of the garden tool device 10. In this alternative embodiment of the garden tool device 10, the forearm receptacle 16 can either be permanently attached at the first end 18 of the elongated body 12, or slidably and adjustably engageable in a hollow opening (not shown) in the first end 18 of the elongated body 12.

To operate the present invention as described in the illustrative embodiments of FIGS 1a–c, the user first inserts the handle 42 of the trowel 24, or other desired gardening tool, into the second end 22 of elongated body 12 and turns the lockdown screw 45 of the maintaining mechanism 44 until the handle 42 is securely engaged inside the second end 22 of elongated body 12. The user then inserts his or her forearm into the forearm receptacle 16, grasps the hand grip 14 in the palm of the hand and then secures the flexible strap 56 across the user's forearm as previously described and attaches the free end of the strap 56 to the outer surface 54 of forearm receptacle 16. The user can then begin to garden. Added force from the rest of the user's body transmitted to the garden tool device 10 through the upper arm, lower arm and hand of the user is applied to the garden tool device 10 because more of the arm and the body of the user is being used to operate and apply leverage to the garden tool by using the ground as a fulcrum. This increased force allows increased crowding of a trowel, for example, into the soil while minimizing fatigue in the hands and arms by allowing use of the forearm muscles directly with the hand to which they are attached thereby avoiding stressful and wrong angle pressure on the wrist as compared to using a short garden tool that relies on wrist muscle without garden tool device 10.

The embodiment of the present invention illustrated in FIGS. 2a–c is used in a similar fashion, with the exception that the various garden tools are permanently fixed to one end of elongated body 12.

The foregoing description of the embodiments of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and modifications as are suited to the particular use contemplated. It is intended that the scope of the invention not be limited by the specification, but be defined by the claims set forth below.

What is claimed is:

1. A gardening tool device, comprising:
   an elongated body having a first end and a second end, an upper portion and a lower portion, said elongated body having a bend between said upper portion and said lower portion;
   a shaft mounting a forearm receptacle; said shaft attached to the first end of said elongated body for receiving a forearm of a user; said shaft slidably adjustable with said elongated body,
   said forearm receptacle having a lower portion adapted to engage a lower portion of the forearm, and a releasable upper portion adapted to engage an upper portion of the forearm;
   a grip attached to and extending away from said elongated body for gripping said gardening tool device, said grip located on said elongated body at a distance from said forearm receptacle sufficient to enable engagement of the forearm of the user within the forearm receptacle and comfortably hold said grip; and
   a gardening tool securing mechanism for interchangeably securing one of a plurality of gardening tools to the second end of said elongated body, said secured gardening tool aligned with said second end of said elongated body.

2. A gardening tool device as recited in claim 1, wherein the bend in said elongated body defines an approximately 195° angle between said upper portion of the elongated body and said lower portion of the elongated body.

3. A gardening tool device as recited in claim 1, wherein:
   said elongated body includes a hollow portion adjacent said first end;
   said forearm receptacle rigidly mounted on a first shaft, said first shaft adapted to be removably held in said hollow portion of said elongated body.

4. A gardening tool device as recited in claim 3, further to including:
   a shaft securing mechanism in said elongated body and adapted to engage said first shaft to hold said first shaft in a selected position in said upper portion of said elongated body.

5. A gardening tool device as recited in claim 1 wherein said forearm receptacle is U-shaped.

6. A gardening tool device as recited in claim 5 wherein said forearm receptacle has first and second ends;
   said forearm receptacle further including a strap having first and second ends, the first end of said strap fixed to the first end of said forearm receptacle, the second end of said strap detachably fixed to the second end of said forearm receptacle.

7. A gardening tool device as recited in claim 1 wherein said gardening tool securing mechanism is a lockdown screw disposed in an aperture in the elongated body, said lockdown screw adapted to releasably hold said gardening tool to the second end of said elongated body.

8. A gardening tool device as recited in claim 1, wherein said elongated body includes a hollow portion adjacent said second end;
   said gardening tool rigidly mounted on a garden tool shaft, said garden tool shaft adapted to be removably held in said hollow portion of said elongated body.

9. A gardening tool device as recited in claim 8, wherein said gardening tool securing mechanism releasably secures said gardening tool shaft in said hollow portion adjacent said second end of said elongated body.

10. A gardening tool device as recited in claim 1, wherein said bend forms an obtuse angle between said upper portion and said lower portion of said elongated body.

11. A gardening tool device as recited in claim 10, wherein said bend defines an angle of approximately 195° between the upper portion and the lower portion of the elongated body.

12. A gardening tool device as recited in claim 11, wherein said bend is adapted to form an angle of approximately 195° between the gardening tool and the forearm of a user when said gardening tool device is releasably attached to the forearm of the user.

13. A gardening tool device as recited in claim 1, wherein said grip tapers outwardly along its length in a direction away from the elongated body.

14. A gardening tool device, comprising:
   an elongated hollow body having first and second ends, an upper portion and a lower portion, said elongated body having a bend, the bend defining an angle of approximately 195° between said upper portion and said lower portion;
   a first shaft positioned inside the first end of said elongated hollow body and slidably adjustable with said elongated hollow body;

a U-shaped forearm receptacle rigidly mounted to said first shaft, said forearm receptacle adapted to receive a user's forearm;

a releasable strap extending across the open end of said U-shaped forearm receptacle, said strap adapted to engage an upper portion of the forearm of a user;

a grip attached to and extending away from said elongated hollow body;

a plurality of garden tools each rigidly affixed to a corresponding plurality of second shafts;

each of said second shafts selectively and removably securable inside the second end of said elongated hollow body, said second shafts and said garden tools each aligned with said elongated body when secured in said second end of said elongated hollow body.

15. A gardening tool device as recited in claim 14, wherein said first shaft is adjustably and securably positioned inside said first end of said elongated hollow body.

16. A gardening tool device as recited in claim 14, wherein said first shaft is removably positioned inside said first end of said elongated hollow body.

17. A gardening tool device, comprising:

a) an elongated body having a first end and a second end, an upper portion and a lower portion, said elongated body having a bend between said upper portion and said lower portion;

b) a forearm receptacle attached to said first end of said elongated body; said forearm receptacle adapted to receive the forearm of a user;

c) said forearm receptacle having a lower portion adapted to engage a lower portion of the forearm, and an upper portion adapted to engage an upper portion of the forearm;

d) a grip attached to and extending away from said elongated body for gripping said gardening tool device, said grip located on said elongated body at a predetermined distance from said forearm receptacle; and e) a garden tool securing mechanism on said second end of said elongated body to releasably secure a gardening tool to the second end of said elongated body, said secured gardening tool aligned with said second end of said elongated body.

* * * * *